Patented Oct. 4, 1938

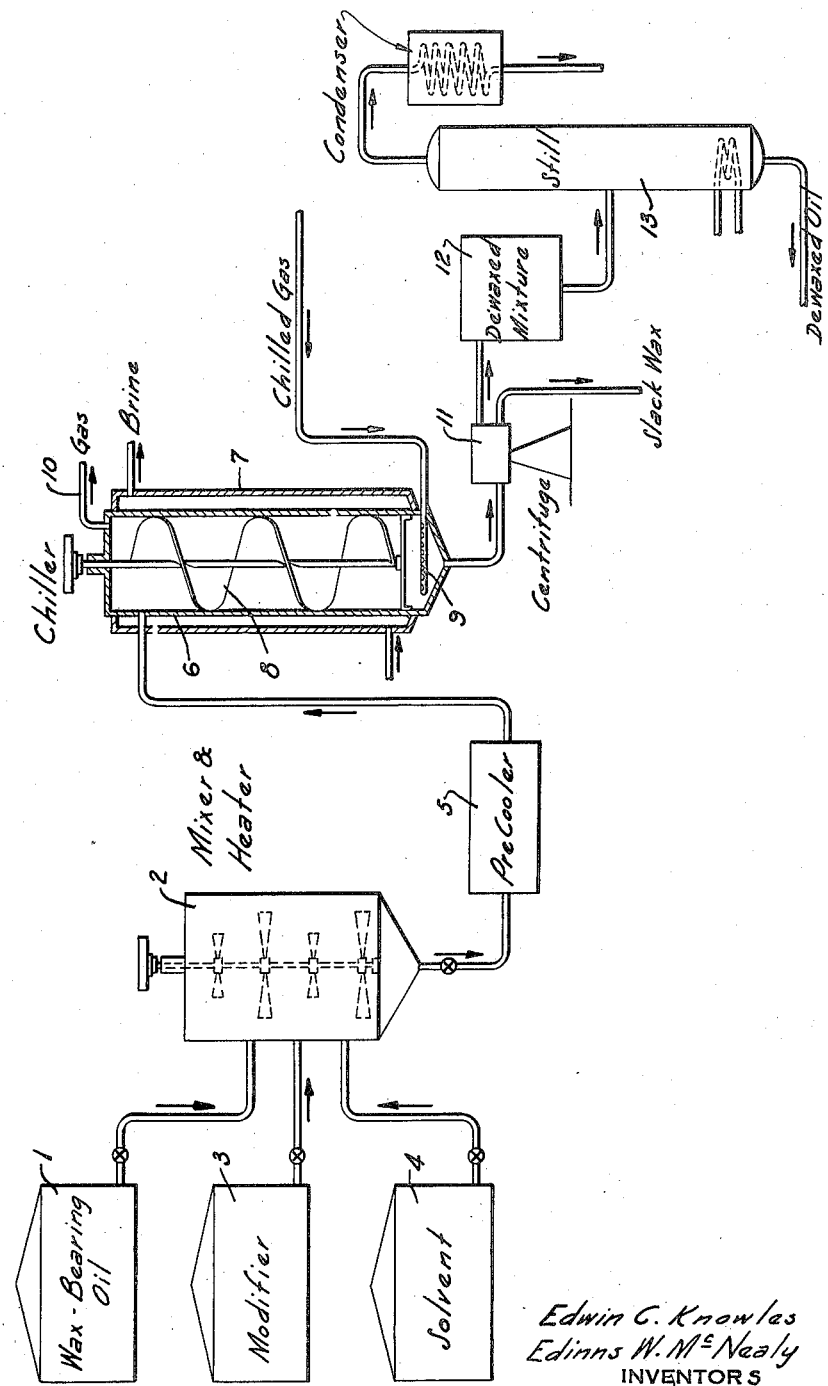

2,132,354

UNITED STATES PATENT OFFICE 2,132,354

DEWAXING WAX-BEARING OIL

Edwin C. Knowles, Beacon, N. Y., and Eddins W. McNealy, Port Arthur, Tex., assignors to The Texas Company, New York, N. Y., a corporation of Delaware Application November 16, 1935, Serial No. 50,098

6 Claims. (Cl. 196—18)

This invention relates to the separation of wax from oil.

The invention broadly contemplates a method of dewaxing oil by centrifuging wherein the oil, containing either a naturally occurring or an added wax crystal modifying substance and mixed with a suitable solvent liquid, is heated to an elevated temperature prior to chilling. The thus heated mixture is then chilled to precipitate the wax and the chilled mixture centrifuged in order to separate the wax thus precipitated.

More specifically, the invention contemplates mixing wax-bearing oil containing a wax crystal modifying substance with a solvent suitable for dewaxing by centrifuging and heating the mixture to a temperature of from 15 to 90° F. above the minimum temperature at which the wax and oil appear to be completely dissolved in the solvent. Thereafter the heated mixture is chilled and centrifuged.

We have found that when wax is removed by centrifuging, the rate of separation of wax may be accelerated and the yield of dewaxed oil increased by heating the mixture of oil and solvent prior to chilling.

The temperature to which the mixture of oil and solvent should be heated prior to chilling depends upon the nature of the oil as well as the solvent used. For the usual lubricating oil fractions the minimum temperature of apparent complete solution of wax and oil in the solvent is around 100–125° F. Relatively viscous heavy oils may require somewhat higher temperatures.

It has been found for example that in the case of dewaxing wax-bearing oil fractions having a Saybolt Universal viscosity of around 80 seconds at 210° F., using a solvent having the essential selective action of a mixture consisting of 35% acetone and 65% benzol, it is advantageous to heat the mixture of oil and solvent to a temperature in the range of 125–175° F. in order to realize an improved filtration rate and improved yield of wax-free oil.

With petroleum hydrocarbon solvents, as for example a solvent comprising pentane, it is desirable to heat the mixture of oil and such solvent to a temperature in the range of about 140–190° F. and preferably to an intermediate temperature of around 165° F.

The present invention involves a specific modification of the novel dewaxing process broadly disclosed in a pending application, Serial No. 41,393 for Dewaxing mineral oil, filed September 20, 1935, in the name of Edwin C. Knowles, one of the present joint applicants. A process of dewaxing oil by filtration has been disclosed in this pending application wherein the oil and solvent are heated to a temperature in the range of 125–175° F. and substantially above the minimum temperature of apparent complete solution of oil and wax in the solvent prior to chilling. Thereafter the heated mixture is chilled and filtered to remove the precipitated wax. As disclosed in this pending application, heating the mixture of oil and solvent in this manner apparently modifies the crystal structure of the wax so that it is precipitated from the solution in a more readily filterable form. As a consequence, more rapid filtration of wax from the mixture is realized and at the same time a greatly improved yield of wax-free oil is obtained along with a much smaller volume of wax cake.

As disclosed in the above mentioned application, these results were realized particularly in the case of dewaxing wax-bearing oil having a Saybolt Universal viscosity of 80 seconds and above at 210° F. It was also stated that these improved results were realized in the case of relatively lower viscosity oils when a wax crystal modifying substance was added to the wax-bearing oil.

The relatively viscous oils apparently contain naturally occurring asphaltic and resinous constituents partaking of the character of wax crystal modifying material under certain conditions. Relatively less viscous oils, that is oils up to about 75 Saybolt Universal seconds at 210° F., are apparently deficient in these naturally occurring constituents, and therefore it is advantageous to add a modifying substance to these oils when dewaxing them by the process of this invention.

It appears that the constituents forming this naturally occurring or added wax crystal modifying material are less soluble than wax in the dewaxing solvent liquid and at the minimum temperature at which the wax-bearing oil appears to be in complete solution, these constituents are not in true solution but rather are present as a colloidal solution.

In this form these constituents possibly form films on the small plate type paraffin crystals formed during preliminary precipitation of the wax from the solution and these films inhibit the normal transformation of the plate type wax crystals into the more easily filterable type of crystals.

By heating to temperatures of 15 to 90° F. above this minimum temperature of apparent complete solution, these colloidal or low solubility substances are apparently completely dissolved in the solution. It is believed that upon chilling the solution, heated as above, they precipitate from the solution substantially coextensively with the wax in the form of nuclear particles which actually facilitate crystallization of wax in a more readily separable form. It is thought that the optimum effect is realized when the modifying substance continues to precipitate from the solution over the entire range of wax crystallization.

It is believed that in the case of using added wax crystal modifying substances, the above preliminary heating step likewise causes the coextensive precipitation of the substance with the wax, since it has been found that the effect of these added substances upon the crystal structure of the wax and the facility with which the resulting precipitated wax may be separated from the solution is greatly enhanced by heating the solution to a sufficiently elevated temperature prior to chilling.

By way of example, we have found that when a solvent refined distillate stock of about 111 Saybolt Universal seconds viscosity at 210° F., and derived from Mid-Continent crude, is mixed with cylinder stock naphtha such as is used in the usual centrifuge operation, and the mixture heated to a temperature of 185° F. prior to chilling, the degree of settling of precipitated wax from the mixture upon chilling to −12° F., is around 125% greater than when the mixture is not heated to temperatures above about 100° F. to 125° F. prior to chilling.

The same improvement has been observed in the case of a solvent refined residual stock having a viscosity of 117 Saybolt Universal seconds at 210° F. and derived from Mid-Continent crude.

Similarly, this improvement in the degree of settling has been observed in the case of relatively less viscous oils to which have been added a small amount of a wax crystal modifying material such as Montan wax, aluminum stearate or the material obtained by condensation of chlorinated wax and naphthalene and known in the industry as "Paraflow". Thus when from 0.1 to about 1% of such modifying material is added to a wax-bearing distillate of about 70 Saybolt Universal seconds at 210° F., the wax separates as a finely grained precipitate which settles with pronounced readiness. The wax is in a much less bulky form and the volume of wax removed is about ⅕ the volume of that removed when the mixture of oil and solvent is not subjected to the preliminary heating step of my invention.

When aluminum stearate or Montan wax, for example, comprises the modifying substance, it may be advantageous to prepare a gel by mixing a small amount of the substance with some relatively low viscosity lubricating oil and heating. The resulting gel is then incorporated in the wax-bearing oil either before or after mixing with the solvent.

In order to further describe the operation of the process of my invention, reference will now be made to the accompanying drawing in which a wax-bearing distillate of 70 Saybolt Universal seconds at 210° F. is dewaxed by centrifuging.

As shown in the drawing, the wax-bearing oil is conducted from a tank 1 to a mixer and heater 2.

A small amount of wax crystal modifying substance in the proportion of about .2% by weight of the wax-bearing oil is drawn from the tank 3 and delivered to the mixer 2.

A solvent comprising cylinder stock naphtha is conducted from a tank 4 to the mixer 2 in the proportion of about 3 or 4 volumes of solvent to 1 volume of wax-bearing oil.

After complete mixing and heating to a temperature of around 160° F. in the mixer 2, the resulting solution is conducted to a precooler 5 wherein it is cooled to a temperature in the range of 100–120° F. The partially cooled mixture is then conducted to the top of a vertical chiller 6.

This chiller comprises a vertical vessel surrounded with an annular jacket 7 through which cold brine is circulated. It is also provided with an internal scroll type of scraper 8 adapted to scrape adhering wax from the interior surfaces of the chiller. A distributor 9 is positioned in the bottom of the chiller for introducing the chilled gas to the lower portion thereof.

The gas thus introduced to the chiller is caused to bubble upwardly through the mixture of oil and solvent advantageously at the rate of about 4 or 5 cubic feet per square foot of internal horizontal cross sectional area. Gas is thus introduced at a rate sufficient to subject the mixture to relatively mild chilling.

The gas after passage through the liquid mixture escapes from the top of the chiller through an outlet 10. From this outlet it may be recycled through a chilling and conditioning means, not shown, and thereafter returned to the bottom of the chiller.

The chilled mixture is withdrawn from the bottom of the chiller 6 and conducted to a centrifuge or bank of centrifuges 11 wherein the precipitated wax is centrifugally separated from the oil and solvent mixture. The separated wax is thus drawn off as a slack wax.

The centrifuged liquid mixture is delivered to a tank 12 and from there to a still 13 wherein the solvent is evaporated and recovered from the dewaxed oil.

It is contemplated that other petroleum fractions besides cylinder stock naphtha may be used as the solvent.

Obviously many modifications and variations of the invention, as hereinbefore set forth, may be made without departing from the spirit and scope thereof, and therefore only such limitations should be imposed as are indicated in the appended claims.

We claim:

1. The method of dewaxing a wax-bearing mineral lubricating oil which comprises mixing the oil containing a wax crystal modifying material with a normally liquid hydrocarbon solvent of such character and in such proportion with the oil that the minimum temperature at which the wax and oil appear to be completely dissolved in the solvent is around 100 to 125° F., heating the mixture to an elevated temperature of around 160 to 185° F. such that the wax and oil remain completely dissolved in the solvent at the elevated temperature and such that upon chilling the heated mixture to around 0° F. and separating the precipitated wax by settling, the rate of separation is more than double that realized where the mixture is heated only to about said minimum temperature, chilling the mixture to a temperature of 0° F. and below, and centrifuging the chilled mixture to remove the precipitated wax.

2. The method of dewaxing a wax-bearing mineral lubricating oil which comprises mixing the oil with a normally liquid hydrocarbon solvent of such character and in such proportion with the oil that the minimum temperature at which the wax and oil appear to be completely dissolved in the solvent is around 100 to 125° F., incorporating in the mixture a wax crystal modifying material in small amount, heating the resulting mixture to an elevated temperature of around 160 to 185° F. such that the wax and oil remain completely dissolved in the mixture at such elevated temperature and such that upon chilling to around 0° F. and separating the wax by settling, the bulk of the precipitated wax so separated is about one-fifth of that separated when the mixture is heated only to about said minimum solution temperature, chilling the mixture to about 0° F. and below, and centrifuging the chilled mixture to remove the wax thus precipitated.

3. The method of dewaxing a wax-bearing mineral lubricating oil which comprises mixing the oil containing a wax crystal modifying material with a normally liquid hydrocarbon dewaxing solvent of such character and in such proportion with the oil that the wax and oil are completely dissolved in the solvent at a temperature of 125° F., heating the resulting mixture to a temperature of around 165° F. such that upon chilling to around 0° F. and separating the wax by settling the rate of separation is unexpectedly increased over that realized when the mixture is heated only to about 125° F., chilling the mixture to about 0° F. and below, and centrifuging the chilled mixture to remove the wax thus precipitated.

4. The method of dewaxing a wax-bearing mineral lubricating oil which comprises mixing the oil containing a wax crystal modifying material with a normally liquid hydrocarbon dewaxing solvent of such character and in such proportion with the oil that the wax and oil are completely dissolved in the solvent at a temperature of about 125° F., heating the resulting mixture to a temperature of around 165° F. such that upon chilling to around 0° F. and separating the wax by settling the rate of separation is unexpectedly increased over that realized when the mixture is heated only to about 125° F., chilling the mixture to 0° F. and below to precipitate wax, and separating the wax from the chilled mixture by difference of specific gravity.

5. The method of dewaxing a wax-bearing mineral lubricating oil which comprises mixing the oil containing a wax crystal modifying material with a normally liquid hydrocarbon dewaxing solvent of such character and in such proportion with the oil that the wax and oil are completely dissolved in the solvent at a temperature of about 125° F., heating the resulting mixture to an elevated temperature of around 160 to 185° F. such that upon chilling to around 0° F. and separating the wax by settling the rate of separation is unexpectedly increased over that realized when the mixture is heated only to about 125° F., chilling the mixture to 0° F. and below to precipitate wax, and separating the wax from the chilled mixture by difference of specific gravity.

6. The method of dewaxing a wax-bearing mineral lubricating oil which comprises mixing the oil containing a wax crystal modifying material with a normally liquid hydrocarbon dewaxing solvent of such character and in such proportion with the oil that the wax and oil are completely dissolved in the solvent at a temperature of about 125° F., heating the resulting mixture to an elevated temperature of around 160 to 185° F. such that upon chilling to around 0° F. and separating the wax by settling the rate of separation is unexpectedly increased over that realized when the mixture is heated only to about 125° F., chilling the mixture to 0° F. and below to precipitate wax, and separating the wax by subsidence from the chilled mixture.

EDWIN C. KNOWLES.
EDDINS W. McNEALY.